US010432536B1

(12) United States Patent
Subramanian et al.

(10) Patent No.: US 10,432,536 B1
(45) Date of Patent: Oct. 1, 2019

(54) SYSTEMS AND METHODS FOR POLICING STREAMS IN A NETWORK

(71) Applicant: Xilinx, Inc., San Jose, CA (US)

(72) Inventors: Ramesh R. Subramanian, Hyderabad (IN); Ravinder Sharma, Hyderabad (IN); Ashif Khan Mohammed, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/837,336

(22) Filed: Dec. 11, 2017

(51) Int. Cl.
| H04L 12/813 | (2013.01) |
| H04L 12/851 | (2013.01) |
| H04L 12/859 | (2013.01) |
| H04L 12/927 | (2013.01) |
| H04L 12/807 | (2013.01) |

(52) U.S. Cl.
CPC .......... H04L 47/20 (2013.01); H04L 47/2441 (2013.01); H04L 47/2475 (2013.01); H04L 47/805 (2013.01); H04L 47/27 (2013.01)

(58) Field of Classification Search
CPC ....... H04L 47/11; H04L 47/20; H04L 47/215; H04L 47/24; H04L 47/2433; H04L 47/2441; H04L 47/2475; H04L 47/27; H04L 47/805; H04L 12/4645; H04L 47/10; H04L 47/36; H04L 47/39
See application file for complete search history.

(56) References Cited

U.S. PATENT DOCUMENTS

| 6,046,979 | A  | * | 4/2000 | Bauman  | H04L 47/20  370/229 |
| 6,181,704 | B1 | * | 1/2001 | Drottar | H04L 1/0057 370/231 |
| 6,359,861 | B1 | * | 3/2002 | Sui     | H04L 49/205 370/230 |
| 6,560,196 | B1 | * | 5/2003 | Wei     | H04L 12/5602 370/230.1 |
| 6,580,721 | B1 | * | 6/2003 | Beshai  | H04L 47/10 370/395.2 |
| 6,724,721 | B1 | * | 4/2004 | Cheriton| H04L 45/745 370/229 |

(Continued)

OTHER PUBLICATIONS

Haddock, Stephen "Frame Metering in 802.1Q", Version 1, Jan. 15, 2013, 20 pages, http://www.ieee802.org/1/files/public/docs2013/new-tsn-haddock-flow-metering-in-Q-0113-v01.pdf.

(Continued)

*Primary Examiner* — Eric Nowlin
(74) *Attorney, Agent, or Firm* — David O'Brien

(57) ABSTRACT

A network device includes a first port, a second port, and a traffic policer circuit. The traffic policer circuit is configured to provide a frame credit and a credit state associated with the frame credit, receive a start of a first frame of a first stream from the first port, and determine a first estimate frame length of the first frame based on the frame credit and credit state. After the first estimate frame length is generated and prior to an end of the first frame is received, the first frame is metered based on the first estimate frame length to mark the first frame with a first marking. After the end of the first frame is received, the frame credit and credit state are updated based on the first frame. The first frame is forwarded to the second port by policing the first frame based on the first marking.

20 Claims, 11 Drawing Sheets

(56) References Cited

U.S. PATENT DOCUMENTS

| | | | | |
|---|---|---|---|---|
| 6,987,738 B2* | 1/2006 | Subramanian | H04L 47/10 | 370/252 |
| 7,061,867 B2* | 6/2006 | Huang | H04L 47/10 | 370/230 |
| 7,142,514 B2* | 11/2006 | Wang | H04L 47/20 | 370/235 |
| 7,280,476 B2* | 10/2007 | Anderson | H04L 12/5602 | 370/230 |
| 7,310,349 B2* | 12/2007 | Beshai | H04L 47/10 | 370/229 |
| 7,324,536 B1* | 1/2008 | Holtey | H04L 47/10 | 370/412 |
| 7,349,342 B2* | 3/2008 | Carpenter | H04L 43/00 | 370/235.1 |
| 7,372,811 B1* | 5/2008 | Ahn | H04L 12/66 | 370/231 |
| 7,385,982 B2* | 6/2008 | Warden | H04L 47/10 | 370/392 |
| 7,403,488 B2* | 7/2008 | Gu | H04L 47/10 | 370/230 |
| 7,436,767 B1* | 10/2008 | Wei | H04L 12/5602 | 370/230.1 |
| 7,474,668 B2* | 1/2009 | Bauman | H04L 29/06 | 370/235.1 |
| 7,554,919 B1* | 6/2009 | Veeragandham | H04L 47/263 | 370/236 |
| 7,567,620 B2* | 7/2009 | Rozental | H04L 12/2801 | 375/260 |
| 7,630,312 B1* | 12/2009 | Cheriton | H04L 45/745 | 370/235 |
| 7,643,504 B2* | 1/2010 | Hadas | H04L 47/10 | 370/412 |
| 7,646,717 B1* | 1/2010 | Anker | H04L 47/527 | 370/235 |
| 7,779,155 B2* | 8/2010 | Zeitak | H04L 47/10 | 709/240 |
| 7,817,640 B2* | 10/2010 | Yuan | H04L 47/527 | 370/392 |
| 7,881,194 B1* | 2/2011 | James | H04L 47/10 | 370/230.1 |
| 7,894,347 B1* | 2/2011 | Anker | H04L 47/527 | 370/235 |
| 7,945,719 B2* | 5/2011 | Hunsaker | H04L 12/40 | 370/375 |
| 7,961,607 B2* | 6/2011 | De Cnodder | H04L 47/10 | 370/230 |
| 7,978,609 B2* | 7/2011 | Veeragandham | H04L 47/263 | 370/236 |
| 8,027,256 B1* | 9/2011 | Subramanian | H04L 47/20 | 370/231 |
| 8,072,988 B2* | 12/2011 | Dropps | H04L 49/506 | 370/230 |
| 8,094,552 B1* | 1/2012 | Sachidanandam | H04L 47/39 | 370/230 |
| 8,116,311 B1* | 2/2012 | Kunz | H04L 49/90 | 370/389 |
| 8,250,231 B2* | 8/2012 | Boden | H04L 47/10 | 709/200 |
| 8,305,889 B2* | 11/2012 | Watts | H04L 12/56 | 370/229 |
| 8,400,924 B2* | 3/2013 | Wang | G06F 13/385 | 370/235 |
| 8,483,194 B1* | 7/2013 | Wu | H04W 72/1257 | 370/338 |
| 8,498,213 B2* | 7/2013 | Gnanasekaran | H04L 41/0213 | 370/242 |
| 8,619,567 B2* | 12/2013 | James | H04L 47/10 | 370/230.1 |
| 8,730,931 B1* | 5/2014 | Wu | H04W 72/1257 | 370/338 |
| 8,730,982 B2* | 5/2014 | Wu | H04L 47/525 | 370/412 |
| 8,767,561 B2* | 7/2014 | Gnanasekaran | H04L 41/0213 | 370/242 |
| 8,977,774 B2* | 3/2015 | Baden | H04L 47/10 | 709/233 |
| 9,025,451 B2* | 5/2015 | Pandit | H04L 47/263 | 370/231 |
| 9,210,060 B2* | 12/2015 | Ayandeh | H04L 47/39 | |
| 9,271,303 B2* | 2/2016 | Pettersson | H04W 72/1252 | |
| 9,282,051 B2* | 3/2016 | Bouley | H04L 47/822 | |
| 9,572,135 B2* | 2/2017 | Wu | H04W 72/1257 | |
| 9,608,927 B2* | 3/2017 | Nishimura | H04L 47/527 | |
| 9,665,519 B2* | 5/2017 | Mirza | G06F 13/4027 | |
| 9,703,739 B2* | 7/2017 | Mirza | G06F 13/4027 | |
| 9,722,942 B2* | 8/2017 | Kitada | H04L 47/6215 | |
| 9,729,457 B2* | 8/2017 | Kalkunte | H04L 45/123 | |
| 10,205,604 B2* | 2/2019 | Liu | H04L 47/621 | |
| 10,219,254 B2* | 2/2019 | Wu | H04W 72/1257 | |
| 2002/0087715 A1* | 7/2002 | De Cnodder | H04L 47/10 | 709/235 |
| 2002/0147022 A1* | 10/2002 | Subramanian | H04L 47/10 | 455/453 |
| 2003/0076848 A1* | 4/2003 | Bremler-Barr | H04L 29/06 | 370/412 |
| 2003/0185155 A1* | 10/2003 | Huang | H04L 47/10 | 370/235 |
| 2003/0189935 A1* | 10/2003 | Warden | H04L 47/10 | 370/395.21 |
| 2003/0189947 A1* | 10/2003 | Beshai | H04L 47/10 | 370/428 |
| 2003/0223369 A1* | 12/2003 | Anderson | H04L 12/5602 | 370/235 |
| 2003/0231593 A1* | 12/2003 | Bauman | H04L 29/06 | 370/235 |
| 2004/0184404 A1* | 9/2004 | Carpenter | H04L 43/00 | 370/235 |
| 2005/0180444 A1* | 8/2005 | Gu | H04L 47/10 | 370/412 |
| 2005/0243848 A1* | 11/2005 | Yuan | H04L 47/527 | 370/412 |
| 2006/0015917 A1* | 1/2006 | Rozental | H04L 12/2801 | 725/111 |
| 2006/0098681 A1* | 5/2006 | Cafiero | H04L 12/4625 | 370/445 |
| 2007/0070895 A1* | 3/2007 | Narvaez | H04L 47/10 | 370/230 |
| 2007/0104210 A1* | 5/2007 | Wu | H04L 47/525 | 370/412 |
| 2008/0025214 A1* | 1/2008 | Bettink | H04L 47/10 | 370/230 |
| 2008/0031137 A1* | 2/2008 | Carpenter | H04L 43/00 | 370/235 |
| 2008/0072098 A1* | 3/2008 | Hunsaker | H04L 12/40 | 713/501 |
| 2008/0123526 A1* | 5/2008 | Hadas | H04L 47/10 | 370/231 |
| 2008/0209186 A1* | 8/2008 | Boden | H04L 47/10 | 712/225 |
| 2009/0193144 A1* | 7/2009 | Zeitak | H04L 47/10 | 709/240 |
| 2009/0245246 A1* | 10/2009 | Veeragandham | H04L 47/263 | 370/389 |
| 2011/0116371 A1* | 5/2011 | James | H04L 47/10 | 370/230.1 |
| 2011/0188507 A1* | 8/2011 | Watts | G06F 15/173 | 370/401 |
| 2011/0292901 A1* | 12/2011 | Pettersson | H04W 72/1252 | 370/329 |
| 2012/0008500 A1* | 1/2012 | Wang | G06F 13/385 | 370/235 |
| 2012/0063329 A1* | 3/2012 | Gnanasekaran | H04L 41/0213 | 370/248 |
| 2012/0317398 A1* | 12/2012 | Boden | H04L 47/10 | 712/30 |
| 2013/0242742 A1* | 9/2013 | Nishimura | H04L 47/20 | 370/235.1 |

(56) References Cited

U.S. PATENT DOCUMENTS

| | | | | |
|---|---|---|---|---|
| 2013/0286858 A1* | 10/2013 | Gnanasekaran | H04L 41/0213 | 370/244 |
| 2014/0160929 A1* | 6/2014 | Wu | H04W 72/1257 | 370/235 |
| 2014/0192819 A1* | 7/2014 | Nishimura | H04L 47/527 | 370/412 |
| 2014/0204742 A1* | 7/2014 | Pandit | H04L 47/263 | 370/231 |
| 2014/0219128 A1* | 8/2014 | Wu | H04W 72/1257 | 370/252 |
| 2014/0280885 A1* | 9/2014 | Ayandeh | H04L 43/0894 | 709/224 |
| 2014/0286349 A1* | 9/2014 | Kitada | H04L 47/6215 | 370/412 |
| 2014/0321473 A1* | 10/2014 | Chen | H04L 49/90 | 370/417 |
| 2015/0003250 A1* | 1/2015 | Bouley | H04L 47/39 | 370/236 |
| 2015/0215224 A1* | 7/2015 | Pandit | H04L 47/263 | 370/235 |
| 2016/0055111 A1* | 2/2016 | Mirza | G06F 13/4027 | 710/309 |
| 2016/0055112 A1* | 2/2016 | Mirza | G06F 13/4027 | 710/306 |
| 2016/0315865 A1* | 10/2016 | Kalkunte | H04L 45/123 | |
| 2017/0302467 A1* | 10/2017 | Liu | H04L 47/621 | |
| 2018/0097739 A1* | 4/2018 | De Vleeschauwer | H04L 47/39 | |
| 2018/0152934 A1* | 5/2018 | Wu | H04W 72/1257 | |
| 2019/0065086 A1* | 2/2019 | Margetts | G06F 3/0625 | |
| 2019/0095995 A1* | 3/2019 | Rohlfs | G06Q 40/04 | |

OTHER PUBLICATIONS

Jochim, Markus, General Motors Research & Development, "Ingress Policing", IEEE 802.1 TSN Plenary, Nov. 10-15, 2013, 43 pages, Dallas, USA.

MEF Technical Specification MEF 103, Ethernet Services Attributes Phase 3, Oct. 2013, The MEF Forum 2013, 120 pgs.

* cited by examiner

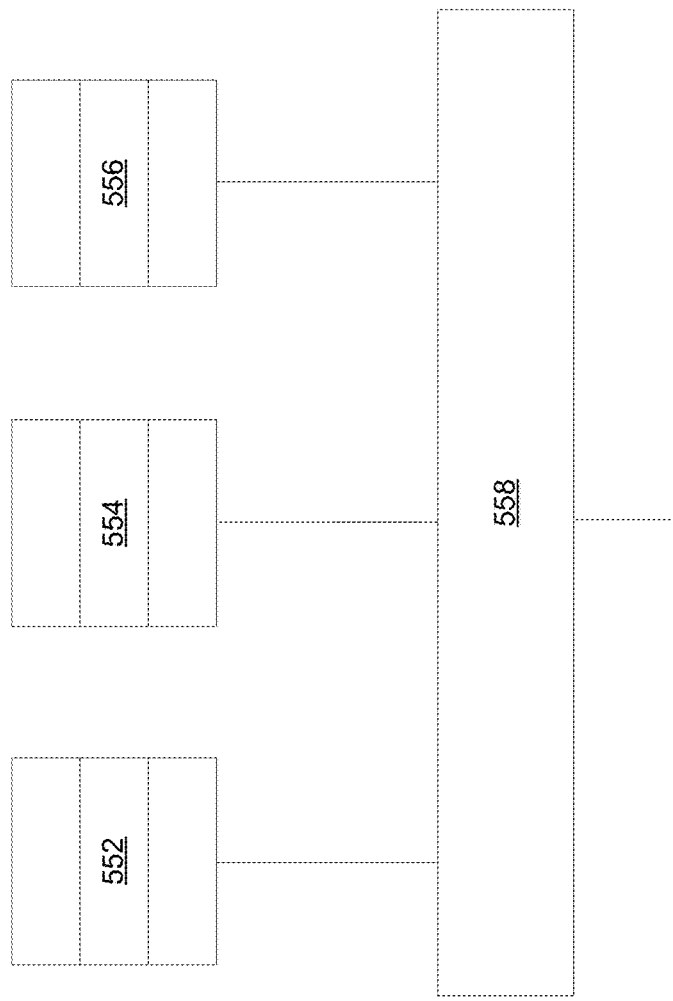

```
1   If (credit state == 00 or 01)
2       If ( frame credit > actual frame length)
3           frame credit = frame credit – actual frame length
4           credit state = 01
5       else
6           frame credit = actual frame length – frame credit
7           credit state = 10
8       end
9   else
10      frame credit = actual frame length
11      credit state = 10
12  end
```

FIG. 7

|  | 604 | 606 | | | 612, 614 | |
|---|---|---|---|---|---|---|
|  | Frame Index n | frame credit | credit state | estimate metering frame length | actual frame length | frame credit | credit state |
| 802 | 1 | 2000 | 00 | 2000 | 64 | 1936 | 01 |
| 804 | 2 | 1936 | 01 | 0 | 1200 | 736 | 01 |
| 806 | 3 | 736 | 01 | 0 | error | 736 | 01 |
| 808 | 4 | 736 | 01 | 0 | 900 | 164 | 10 |
| 810 | 5 | 164 | 10 | 164 | 600 | 600 | 10 |
| 812 | 6 | 600 | 10 | 600 | error | 600 | 10 |
| 814 | 7 | 600 | 10 | 600 | 1536 | 1536 | 10 |
| 816 | 8 | 1536 | 10 | 1536 | 800 | 800 | 10 |

FIG. 8

SYSTEMS AND METHODS FOR POLICING STREAMS IN A NETWORK

FIELD

Examples of the present disclosure generally relate to integrated circuits (ICs) and, in particular, to an embodiment related to system and methods for policing streams using an IC in a network.

BACKGROUND

In a communication system, a switching device may receive frames containing data or control information on one port, and based on destination information contained within the frames, routes the frames out another port to the destination (or an intermediary destination). Many applications using the communication system, such as process control applications and machine control applications may have a large number of streams. Moreover, these applications may be latency critical to meeting control loop frequency requirements. As such, a highly scalable, low latency stream policing solution is desirable.

Accordingly, it would be desirable and useful to provide an improved way for policing streams in a network.

SUMMARY

In some embodiments in accordance with the present disclosure, a network device includes a first port, a second port, and a traffic policer circuit. The traffic policer circuit is configured to: provide a frame credit and a credit state associated with the frame credit; receive a start of a first frame of a first stream from the first port; determine a first estimate frame length of the first frame based on the frame credit and credit state; after generating the first estimate frame length and prior to receiving an end of the first frame, meter the first frame based on the first estimate frame length to mark the first frame with a first marking; after receiving the end of the first frame, update the frame credit and credit state based on the first frame; and forward the first frame to the second port by policing the first frame based on the first marking.

In some embodiments, the traffic policer circuit is further configured to: prior to receiving the first stream, initialize the frame credit based on a maximum frame length of the first stream.

In some embodiments, the credit state is selected from a group of states comprising an initial credit state indicating that the frame credit has an initial value, a positive credit state indicating that the frame credit has a positive value, and non-positive credit state indicating that the frame credit has a non-positive value.

In some embodiments, to determine the first estimate frame length, the traffic policer circuit is further configured to: in response to a determination that the credit state is the initial credit state, set the first estimate frame length to a value of the frame credit.

In some embodiments, to determine the first estimate frame length, the traffic policer circuit is further configured to: in response to a determination that the credit state is the positive credit state, set the first estimate frame length to a value of zero.

In some embodiments, to determine the first estimate frame length, the traffic policer circuit is further configured to: in response to a determination that the credit state is the non-positive credit state, set the first estimate frame length to an absolute value of the frame credit.

In some embodiments, to update the frame credit and credit state, the traffic policer circuit is further configured to: determine a first actual frame length of the first frame; update the frame credit by deducting the first actual frame length from the frame credit; and write, to a storage element of the network device, the updated frame credit.

In some embodiments, the traffic policer circuit is further configured to: in response to determining that the first frame is an error frame, skip updating the frame credit and credit state.

In some embodiments, the traffic policer circuit is further configured to: after receiving the start of the first frame, perform a first read to retrieve, from the storage element, one or more metering parameters; meter the first frame based on the first estimate frame length and the one or more metering parameters.

In some embodiments, the traffic policer circuit is configured to: after receiving a start of a second frame of a second stream from the first port of the network device, perform a second read to retrieve, from the storage element, the one or more metering parameters; and after performing the second read, meter the second frame of the second stream using the one or more metering parameters.

In some embodiments, the traffic policer circuit is configured to: meter the first stream using a two-rate three-color metering algorithm.

In some embodiments, the first marking is selected from a group of color markings consisting of a green marking, a yellow marking, and a red marking, wherein the green marking is associated with a committed frame for timely delivery, wherein the yellow marking is associated with an excess frame to be delivered on a best effort, and wherein the red marking is associated with a non-conformant frame that is to be discarded.

In some embodiments, a method includes providing, by a network device, a frame credit and a credit state associated with the frame credit; receiving, from a first port of the network device, a start of a first frame of a first stream; determining a first estimate frame length of the first frame based on the frame credit and credit state; after generating the first estimate frame length and prior to receiving an end of the first frame, metering the first frame based on the first estimate frame length to mark the first frame with a first marking; after receiving the end of the first frame, updating the frame credit and credit state based on the first frame; and forwarding, to a second port of the network device, the first frame by policing the first frame using the first marking.

In some embodiments, the method includes prior to receiving the first stream, initializing the frame credit based on a maximum frame length of the first stream.

In some embodiments, the credit state is selected from a group of states comprising an initial credit state indicating that the frame credit has an initial value, a positive credit state indicating that the frame credit has a positive value, and non-positive credit state indicating that the frame credit has a non-positive value.

In some embodiments, the determining the first estimate frame length includes: in response to a determination that the credit state is the initial credit state, setting the first estimate frame length to a value of the frame credit.

In some embodiments, the determining the first estimate frame length includes: in response to a determination that the credit state is the positive credit state, setting the first estimate frame length to a value of zero.

In some embodiments, the determining the first estimate frame length includes: in response to a determination that the credit state is the non-positive credit state, setting the first estimate frame length to an absolute value of the frame credit.

In some embodiments, the updating the frame credit and credit state includes: determining a first actual frame length of the first frame; updating the frame credit by deducting the first actual frame length from the frame credit; and writing, to a storage element, the updated frame credit.

In some embodiments, the method includes after receiving the start of the first frame, performing a first read to retrieve, from a storage element of the network device, one or more metering parameters; after performing the first read, metering the first frame based on the first estimate frame length and the one or more metering parameters; after receiving a start of a second frame of a second stream from the first port of the network device, performing a second read to retrieve, from the storage element, the one or more metering parameters; and after performing the second read, metering the second frame of the second stream using the one or more metering parameters.

Other aspects and features will be evident from reading the following detailed description and accompanying drawings.

BRIEF DESCRIPTION OF THE DRAWINGS

FIG. 5 is a block diagram illustrating queuing functions of a switch according to some embodiments of the present disclosure

FIG. 7 illustrates a portion of the method for low-latency metering and policing according to some embodiments of the present disclosure.

FIG. 8 illustrates a table including metering parameters for a sequence of frames of a stream according to some embodiments of the present disclosure.

DETAILED DESCRIPTION

Figure 1:
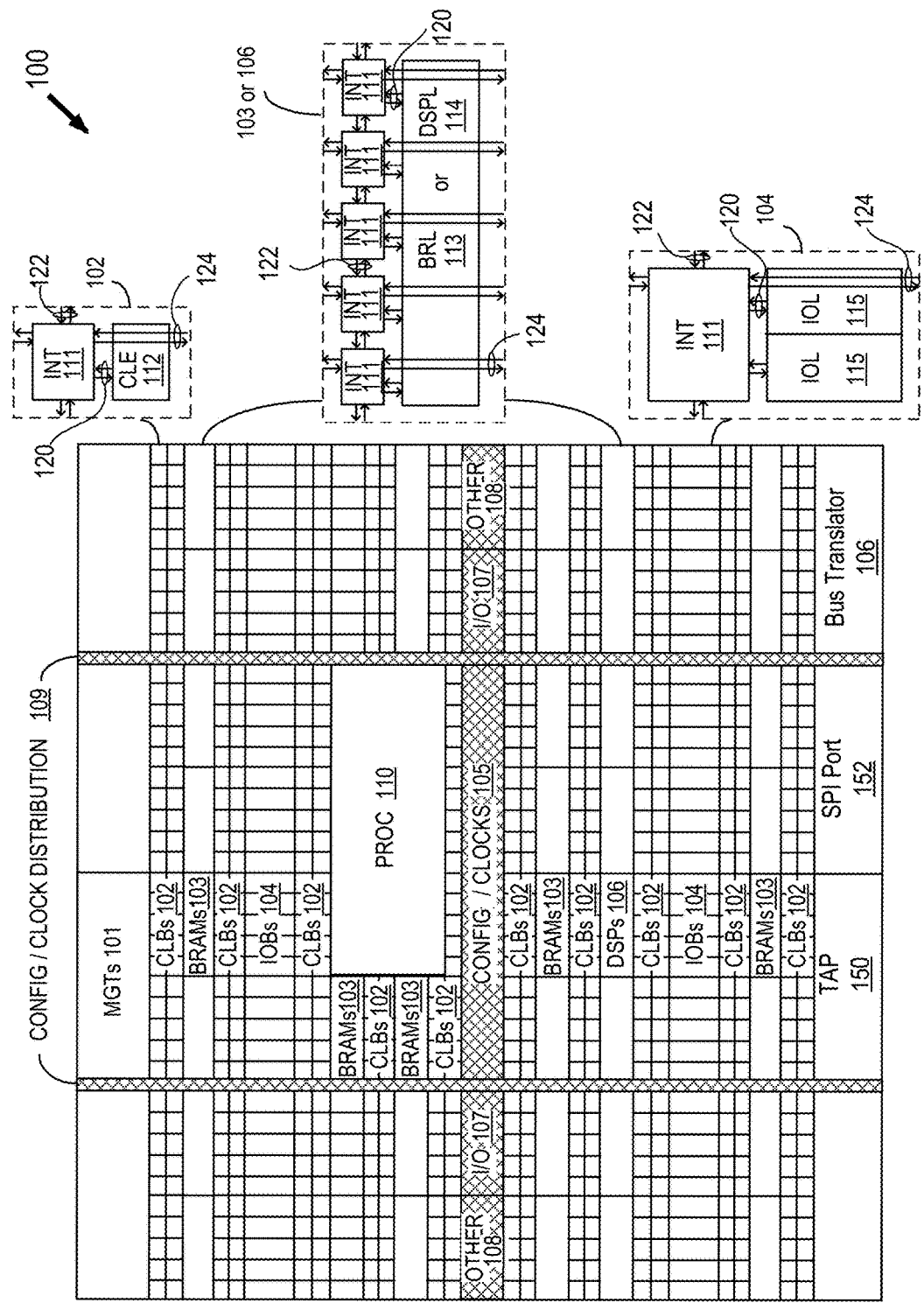
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. For real time communication of time sensitive streams (e.g., in industrial control applications, digital video and audio data) over the networks, network devices (e.g., switches, routers, bridges, etc.) implement low latency, non-blocking, and highly deterministic frame forwarding mechanisms. To enable deterministic real-time communication over Ethernet, Time-Sensitive Networking (TSN) standards have been defined by the IEEE TSN task group. The IEEE TSN standards define mechanisms for the time-sensitive transmission of data over Ethernet networks. These time-sensitive Ethernet frames are typically pre-negotiated for path, identification mechanism, bandwidth, fault tolerance and recovery mechanisms, and are typically referred as TSN streams. By using time synchronization, a schedule shared between network devices, and queues defined based on time, TSN provides a bounded maximum latency for scheduled traffic through switched networks. In TSN, each network node has a buffering and time aware forwarding mechanism to the network. However, since the time aware scheduling mechanism in TSN is on each priority queue, and each priority queue may map multiple streams, the time aware scheduling mechanism in TSN alone may not guarantee the quality of service (QoS) for each stream. To address this, IEEE 802.1Qci defines per stream filtering and policing, where streams are monitored against the corresponding amount of bandwidths received for the streams. Any stream that violates its bandwidth reservation is filtered to ensure the QoS for the streams that are compliant with the corresponding bandwidth reservations. However, stream policing may lead to significant latencies. Further, policing a large number of streams may lead to significant logic area penalties and performance penalties.

For integrated circuit (IC) solutions, it has been discovered that by enabling the metering and policing functions of a frame after receiving a start of that frame and before receiving an end of that frame, low latency (e.g., a zero delay) metering and policing is achieved. Further, by using a shared memory architecture for policing a plurality of streams, higher scalability is achieved.

Various advantages may be present in various applications of the present disclosure. No particular advantage is required for all embodiments, and different embodiments may offer different advantages. One of the advantages of some embodiments is that by providing an estimate metering frame length for a frame, the metering and policing functions may be performed after receiving a start of that frame but before receiving an end of the frame, thereby reducing the delays caused by the metering and policing functions.

Another advantage of some embodiments is that the network device may perform the low-latency metering and policing method by using a shared memory for a plurality of streams received from a particular port of the network device, thereby providers higher scalability. In those embodiments, the shared memory may include various metering parameters (e.g., constant metering parameters, time dependent metering parameters and the associated timestamp). Yet another advantage of some embodiments is that the network device may implement the low-latency metering and policing method with full compliance to IEEE 802.1Qci specification and Time-Sensitive Networking (TSN) standards while achieving very low node to node latency. With the above general understanding borne in mind, various embodiments for metering and policing streams by a network device are generally described below.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the data reordering is not limited to the exemplary IC depicted in FIG. 1, and that IC having other configurations, or other types of IC, may also implement the stream policing system.

Figure 2:
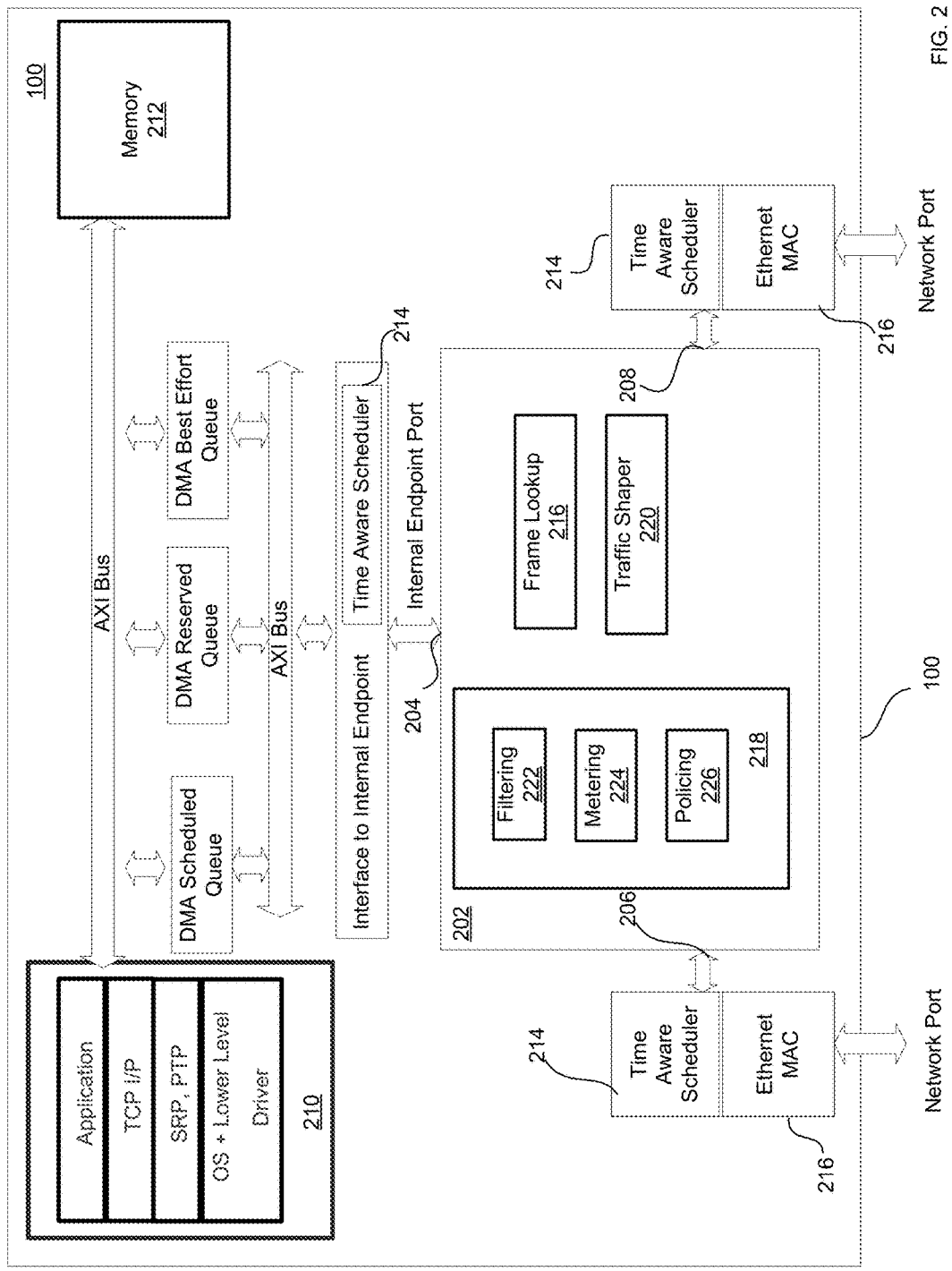
FIG. 2 is a block diagram illustrating an exemplary switch according to some embodiments of the present disclosure.

Referring to FIG. 2, illustrated is an IC 100 including a switch 202. The switch 202 includes three ports 204, 206, and 208. The port 204 connects to a processing unit 210 and a memory 212 through internal buses. As such, the port 204 is also referred to as an internal endpoint port 204. The ports 206 and 208 are connected to an external network through a network interface (e.g., an Ethernet media access control (MAC) interface). As such, ports 206 and 208 are also referred to as network ports 206 and 208.

In some embodiments, the switch 202 supports queues having different priorities (e.g., a scheduled priority, a reserved priority, a best effort priority). For example, a scheduled queue (e.g., including control data) may have a scheduled priority, which indicates that the frames in the scheduled queue are time critical, and have a priority higher than other priorities. For further example, a reserved queue (e.g., including audio/video data) may have a reserved priority, indicating that the frames in the reserved queue are not time critical, and have a lower priority than the scheduled priority. For further example, a best effort queue may have a best effort priority, which indicates that the frames in that best effort queue are not time critical, and have a lower priority than the reserved priority.

In the example of FIG. 2, the switch 202 includes a frame lookup unit 216, a traffic policer 218, and a traffic shaper 220. The frame lookup unit 216 may look up values and actions associated with a particular frame. The traffic policer 218 includes a filtering unit 222, a metering unit 224, and a policing unit 226. The filtering unit 222 may perform filtering using various filtering rules on a per stream basis, and output a filtering decision (e.g., allowing, dropping, or blocking). The filtering unit 222 may then send streams that comply with its filtering rules to the metering unit 224. The metering unit 224 may perform a metering function based on bandwidth profiles, and provide metering decisions (e.g., marking including red, yellow, green) for each frame. The policing unit 226 may then police the network traffic by performing various actions (e.g., allowing, dropping, marking) to the frames based on the filtering decisions and metering decisions.

As illustrated in FIG. 2, time aware schedulers 214 are implemented on egress paths of the switch 202. The egress paths may include an egress path using an egress port of the internal endpoint port 204, an egress path using the egress port of the port 206, and an egress path using the egress port of the port 208. The time aware schedulers 214 may block the non-scheduled queues, so that the corresponding port is idle when the scheduled queue is scheduled for transmission.

Figure 3:
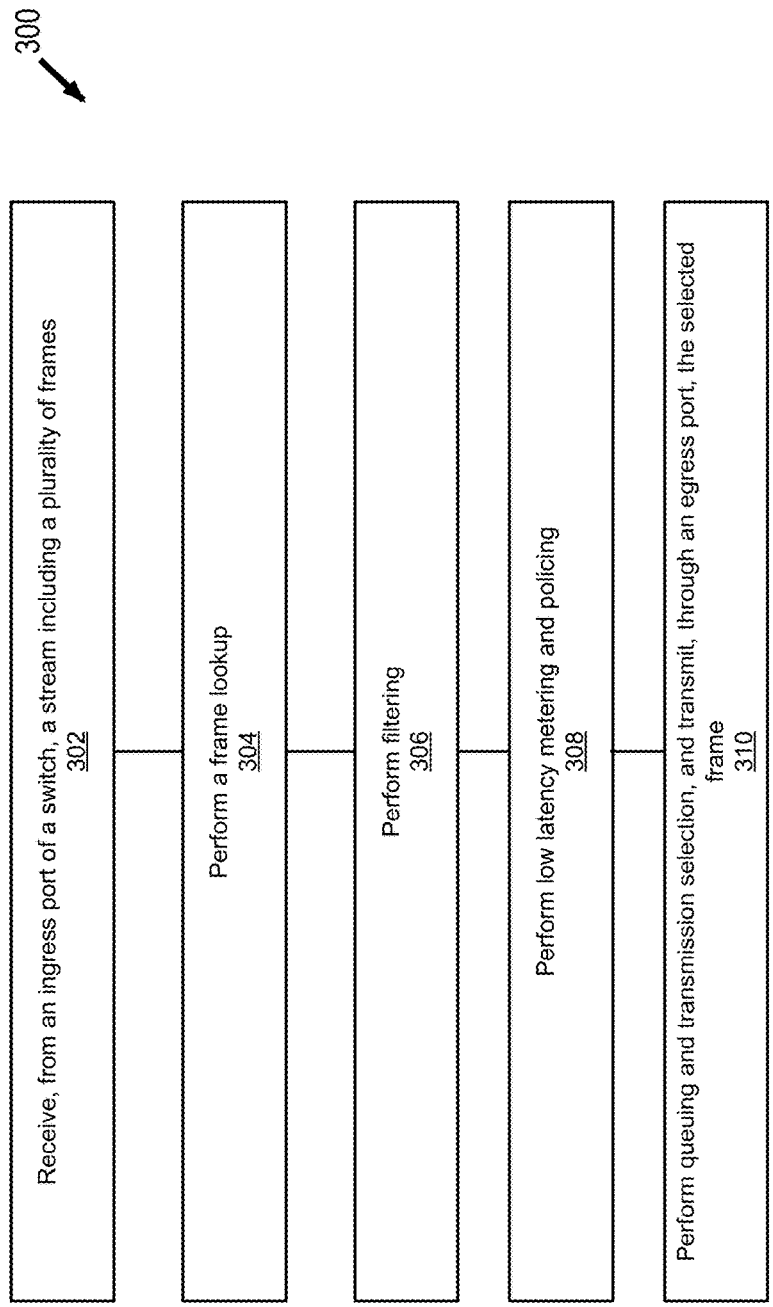
FIG. 3 is a flow diagram illustrating a method for forwarding frames by a switch according to some embodiments of the present disclosure.

Referring to FIG. 3, illustrated thereof is a method 300 of transmitting frames by a switch (e.g., a switch 202 of FIG. 2). The method 300 begins at block 302, where a switch receives, from an ingress port (reception port) of the switch, a stream including a sequence of frames. For example, at block 302, a port (e.g., one of ports 204, 206, and 208) of the switch 202 of FIG. 2 receives a stream including a sequence of frames.

The method 300 may then proceed to block 304, where the switch performs a frame lookup process to determine various lookup values associated with the frames. For example, a frame lookup unit 216 of a switch 202 of FIG. 2 performs a frame lookup process to the received frames to determine egress ports, egress priority queue, translations, actions, etc.) associated with the frames.

Figure 4A:
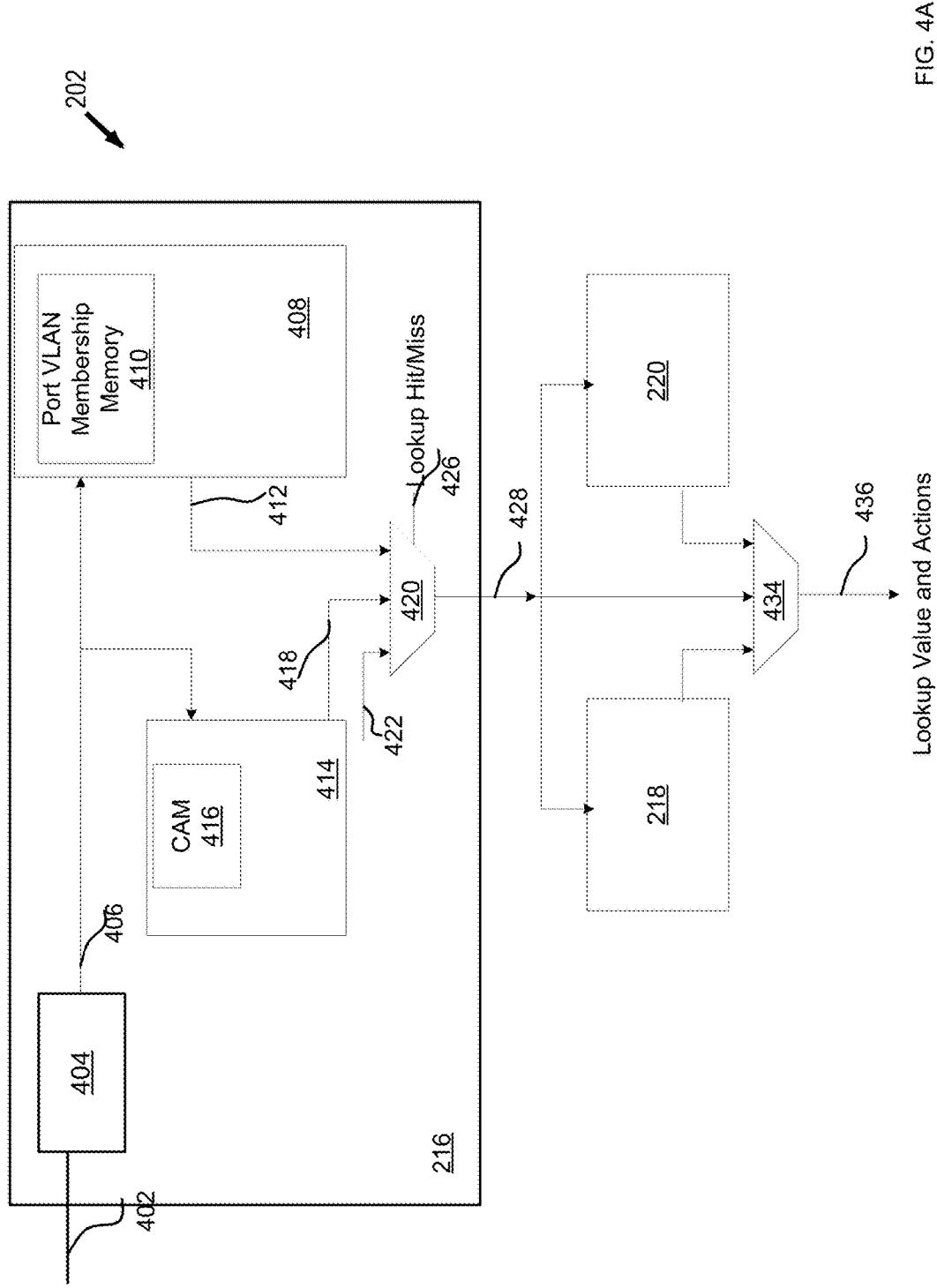
FIG. 4A is a block diagram illustrating lookup levels provided in a switch according to some embodiments of the present disclosure.

Referring to FIG. 4A, at block 304, the frame lookup unit 216 receives a frame 402 of an incoming stream, and sends the frame 402 to a parsing unit 404. The parsing unit 404 may parse the header fields (e.g., destination MAC address, VLAN identifier (ID), priority fields) of the frame 402, and output the parsed frame information 406 including for example, the destination MAC address, VLAN ID, and priority associated with the frame 402.

In the example of FIG. 4A, the frame lookup unit 216 may perform the frame lookup process using multiple memories (e.g., a port VLAN membership memory 410 and a content addressable memory (CAM) 416). For example, the frame lookup unit 216 includes a VLAN membership lookup unit 408, which looks up VLAN member ports using a port VLAN membership memory 410 based on the parsed frame information 406 (e.g., by using the VLAN ID of the parsed frame information 406). The VLAN membership lookup unit 408 may then output the VLAN member ports 412 associated with the frame 402.

Figure 4B:
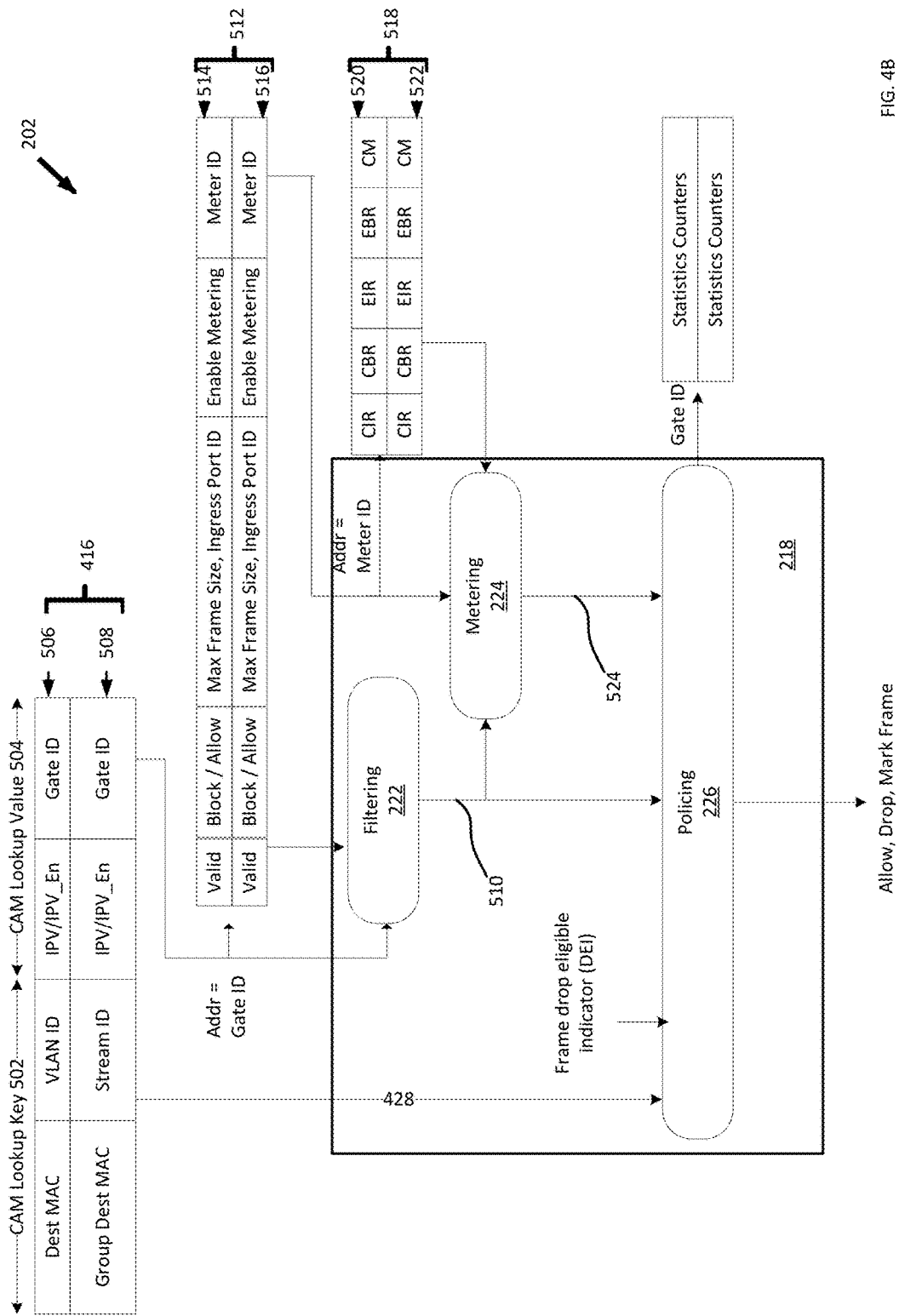
FIG. 4B is a block diagram illustrating filtering and policing functions of a switch according to some embodiments of the present disclosure.

Referring to FIGS. 4A and 4B, the frame lookup unit 216 may include a content addressable memory (CAM) lookup unit 414. As shown in the example of FIG. 4B, the CAM 416 includes a plurality of CAM lookup configurations including CAM lookup configurations 506 and 508. Each of the CAM lookup configurations 506 and 508 includes CAM lookup keys 502 and CAM lookup values 504. The CAM lookup configuration 506 includes CAM lookup keys 502 including a destination MAC address and a VLAN ID, and CAM lookup values 504 including an Internet Protocol (IP) version IPV/IPV_en and a gate ID. The gate ID may be unique for each stream. In some embodiments, the gate ID is an identifier of a gate providing a pass/no-pass function by the switch. The CAM lookup configuration 508 includes CAM lookup keys 502 including a group destination MAC address and a stream ID, and CAM lookup values 504 including an Internet Protocol (IP) version IPV/IPV_en and a gate ID. The CAM lookup unit 414 may look up a gate ID for a particular frame by using the corresponding parsed frame information 406 as the CAM lookup keys. That gate ID may be used in subsequent per-stream filtering, policing, and frame replication and elimination functions, which will be described in detail below.

In some embodiments, the CAM lookup unit 414 looks up a set of actions associated with the frame 402 using a CAM 416 based on the parsed frame information 406 (e.g., a destination MAC address, VLAN ID, and/or a combination thereof). The actions may include an address translation action, a tagging/un-tagging action, and any other suitable actions. The CAM lookup unit 414 then provides a CAM output 418, which may include actions and gate ID associated with the frame 402.

As shown in FIG. 4A, the frame lookup unit 216 may include an output unit 420 receiving the VLAN member ports 412 from the VLAN membership lookup unit 408, receiving the CAM output 418 from the CAM lookup unit 414, and receiving switch control settings 422 (e.g., from a storage element of the switch 202). In an example, the output unit 420 may process the received VLAN member ports 412, CAM output 418, and switch control settings 422, and provide a frame lookup output 428 based on a lookup hit/miss signal 426. In an example, for each frame, the frame lookup output 428 may include an ingress port ID, VLAN member ports 412, actions, gate ID, and/or a combination thereof.

In some embodiments, the frame lookup output 428 may be sent to the traffic policer 218 and traffic shaper 220, and an output unit 434 may provide an output signal 436 including various lookup values and actions.

The method 300 may then proceed to block 306, where the switch performs filtering on a per stream basis. As shown in the example of FIG. 4B, the switch 202 includes a filtering configuration memory 512 includes a plurality of control and filtering configurations (e.g., filtering configurations 514 and 516). Each of the control and filtering configurations may include various filtering parameters, including for example, filtering actions (e.g., "Block/Allow"), a maximum frame size, an ingress port ID, and a metering enablement parameter indicating whether metering is enabled, and a meter ID. The gate ID may be used to retrieve the corresponding control and filtering configuration for the stream.

In various embodiments, a filtering unit 222 of the traffic policer 218 may receive the frame lookup output 428 including the gate ID from the frame lookup unit 216, and the control and filtering configuration retrieved from the filtering configuration memory 512, and perform filtering to the received frame on a per stream basis. The filtering unit 222 may perform filtering based on filtering rules and the stream filtering parameters. In an example, the filtering unit 222 determines that a frame does not comply with its filtering rules and is invalid, and blocks that invalid frame (e.g., using software configuration). In another example, the filtering unit 222 determines that a frame complies with its filtering rules and is valid, and sends that valid frame to subsequent processes (e.g., metering and policing processes). The filtering unit 222 may generate filtering decisions 510 indicating actions (e.g., allowing, dropping, blocking) performed to a particular frame by the filtering unit 222.

In some embodiments, at block 306, the filtering function may be performed based on a switching mode of the switch. The switch 202 may operate under various switching modes, including for example, a cut-through mode and a store and forward mode. The filtering unit 222 uses the blocking feature under the cut-through mode, where the switch starts forwarding a frame (or packet) before the whole frame has been received, normally as soon as the destination address is processed. On the other hand, under a store and forward mode, a frame (or packet) is kept and sent later to the destination by the switch, and the error frames are discarded by the switch.

In various embodiments, a blocked stream may be monitored for recovery from errors. The filtering configuration may include a filter parameter for enabling the blocking feature. Such a filter parameter of the filtering configuration may be updated dynamically.

The method 300 may then proceed to block 308, where the switch 202 performs low latency metering and policing to the frames validated by the filtering unit 222 based on metering configurations.

In some embodiments, the low latency metering and policing functions may be performed based on metering configurations. In the example of FIG. 4B, the switch 202 includes a metering memory 518 including a plurality of metering configurations (e.g., metering configurations 520 and 522). Each metering configuration may include various metering parameters. In some examples where the metering unit 224 uses a two-rate three-color metering algorithm, the metering parameters include bandwidth profile parameters defining the bandwidth profiles. The bandwidth profile parameters include committed information rate (CIR), committed burst size (CBS), excess information rate (EIR), excess burst size (EBS), and color mode (CM). CIR is the average rate up to which frames are delivered per the performance objectives. Such delivered frames are referred to as being CIR-conformant. CBS is the maximum number of bytes allowed for incoming frames to still be CIR-conformant. The CIR-conformant frame may correspond to the color green. In some embodiments, EIR specifies the average rate up to which excess frames (frames having an average rate greater than CIR) are admitted into the network. Such frames are not CIR-conformant, and are delivered without any performance objectives. Those frames may correspond to the color yellow. Frames that have an average rate greater than the EIR are not EIR-conformant and may be dropped. Those frames may correspond to the color red. CM may specify whether the port of the switch is operating in a color aware mode or a colorblind mode.

The switch 202 may use the meter ID in the filtering configuration as an address to look up a metering configuration corresponding to that meter ID. For each ingress port, policing may be performed on a per class basis, a per stream basis, or a per group basis where a group includes multiple streams. In some embodiments, multiple streams may be assigned to the same meter ID, which allows multiple streams to be mapped to the same metering configuration and thereby the same metering function.

In some embodiments, at block 308, the metering unit 224 receives the meter ID, the metering configuration retrieved based on the meter ID, and the filtering decisions 510 from the filtering unit 222, and generates metering decisions 524. In some embodiments, the metering decisions 524 include a marking (e.g., a color) associated with the frame.

In some embodiments, at block 308, a policing unit 226 receives the filtering decisions 510 from the filtering unit 222, receives the metering decisions 524 from the metering unit 224, and receives frame lookup output 428 from the frame lookup unit 216. The policing unit 226 may control the network traffic by performing various actions (e.g., allowing, dropping, marking) to the frame based on the frame lookup output 428, the filtering decisions 510, and the metering decisions 524.

The method 300 may then proceed to block 310, where a traffic shaper 220 of the switch 202 may perform queuing and transmission selection according to the priority and marking of the frames, and transmit the selected frame through a corresponding egress port of the switch 202. Referring to FIG. 5, at block 310, a frame may be sent to different queues based on its marking and associated gate ID. For example, a frame with a scheduled marking is sent to a scheduled traffic queue 552. In another example, a frame with a reserved marking is sent to a reserved traffic queue 554. In yet another example, a frame with a best effort marking is sent to a best effort traffic queue 556. A transmission selection unit 558 may select a frame from the queues and transmit that selected frame through a corresponding egress port of the switch 202.

Referring to FIGS. 6, 7, 8, 9, and 10, a low latency metering and policing method 600 is described. Such a low latency metering and policing method 600 may be used at block 308 of the method 300. As shown in FIGS. 6 through 10, instead of enabling the metering and policing of a particular frame after receiving an end of that particular frame, the method 600 enables the metering and policing of that particular frame after receiving a start of that particular frame. In some embodiments, a credit-based algorithm is used for metering. In those embodiments, the metering parameters may include a frame credit and a credit state. The frame credit may indicate an accumulated frame credit that may be drained by the received frames. The credit state may indicate the state of the frame credit (e.g., "00" for an initial state, "01" for a positive state indicating that the frame credit is positive, and "10" for a non-positive state indicating that the frame credit is negative or zero). The method 600 may generate an estimate metering frame length for a particular frame after receiving a start of that particular frame, and begin the metering function for that particular frame using that estimate metering frame length. As such, the traffic policer 218 does not need to use an actual frame length of that frame to perform the metering function to that frame, where the actual frame length is computed after receiving an end of that frame. The method 600 may update the metering parameters using the actual frame length of that frame after receiving the end of that frame.

The method 600 begins at block 602 to initialize various metering parameters. In an example, the initialization sets the initial values of metering parameters (e.g., a frame credit, a credit state) in a metering memory (e.g., metering memory 518) of the switch 202. In an example, at block 602, a maximum frame length associated with the stream is retrieved from the filtering configuration memory 512 based on the gate ID. A frame credit may have an initial value based on the maximum frame length and the metering algorithm. In an example where a single-rate two-color metering algorithm is used, the frame credit may have an initial value equal to the maximum frame length. In another example where a two-rate three-color metering algorithm is used, the CBS bucket tokens may be considered to include a minimum of two frame length of data, and the frame credit may have an initial value of twice the maximum frame length. A credit state may be initialized (e.g., with an initial value "00" to indicate an initial state). A frame index n may be set to with an initial value of one.

The method 600 may proceed to block 604, where the traffic policer 218 receives a start of the $n^{th}$ frame. The method 600 may proceed to block 606, where the traffic policer 218 may read metering parameters (e.g., the frame credit, the credit state) from the metering memory 518. At block 606, the traffic policer 218 may then determine an estimate metering frame length of the $n^{th}$ frame based on the credit state and the frame credit. In an example where the credit state equals "01," the estimate metering frame length is set to zero. In another example where the credit state is not equal to "01," the estimate metering frame length is set to the value of the frame credit.

The method 600 may then proceed to block 608, where the traffic policer 218 enables the metering and policing of the $n^{th}$ frame. Various metering algorithms, including for example, a two-rate three-color metering algorithm provided by Metro Ethernet Forum (MEF) 10.3, a two-rate three-color marker provided by Request for Comments (RFC) 2698, a single-rate three-color marker defined by RFC 2697, etc., may be used to perform the metering function at block 608.

The method 600 may then proceed to block 610, where the traffic policer 218 determines that it receives an end of the $n^{th}$ frame. The method 600 may then proceed to block 612, and determines whether the $n^{th}$ frame is an error frame. In an example where at block 612 it is determined that the received frame is an error frame, the method 600 proceeds to block 613, where policing results for the error frames are discarded, and the metering parameters (e.g., frame credit, credit state) are not updated for the error frame. The method 600 then proceeds to block 616 and then block 604 to wait for the next frame.

In some embodiments, at block 612, the traffic policer 218 determines that the $n^{th}$ frame is not an error frame. The method 600 may then proceed to block 614, where the metering parameters are updated. For example, the frame credit may be updated (e.g., drained) using an actual frame length of the $n^{th}$ frame. The updated metering parameters for the $n^{th}$ frame may be saved to the metering parameter memory. The policing parameters may then be applied to the $n^{th}$ frame.

Referring to FIG. 7, illustrated is an example method 700 for updating the metering parameters at block 614. The method 700 begins at line 1 to determine whether the credit state indicating a positive frame credit. For example, the credit state may have a value of "00" (initial state) or "01" (positive credit state) to indicate a positive frame credit. For further example, the credit state may have a value of "10" to indicate a non-positive frame credit. After determining that the credit state indicates a positive frame credit, at line 2, the method 700 may compare the frame credit with the actual frame length. If the comparison indicates that the frame credit is greater than the actual frame length, at line 3, the frame credit is updated by deducting the actual frame length from the frame credit. The credit state is updated to have a value of "01." If the comparison between the frame credit and the actual frame length is equal to or less than zero, the method 700 may proceed to lines 6 and 7 to update the frame credit and set the credit state to be "10." Accordingly to lines 10 and 11, if the method 700 determines that the credit state indicates a non-positive frame credit, then it sets the frame credit to have an absolute value of the actual frame length, and update the credit state to be "10" to indicate that the frame credit is non-positive.

At block 614, the traffic policer 218 may then write the updated metering parameters to the metering memory 518. The method 600 may then proceed to blocks 616 and 604 to process the next frame in the stream.

Figure 6:
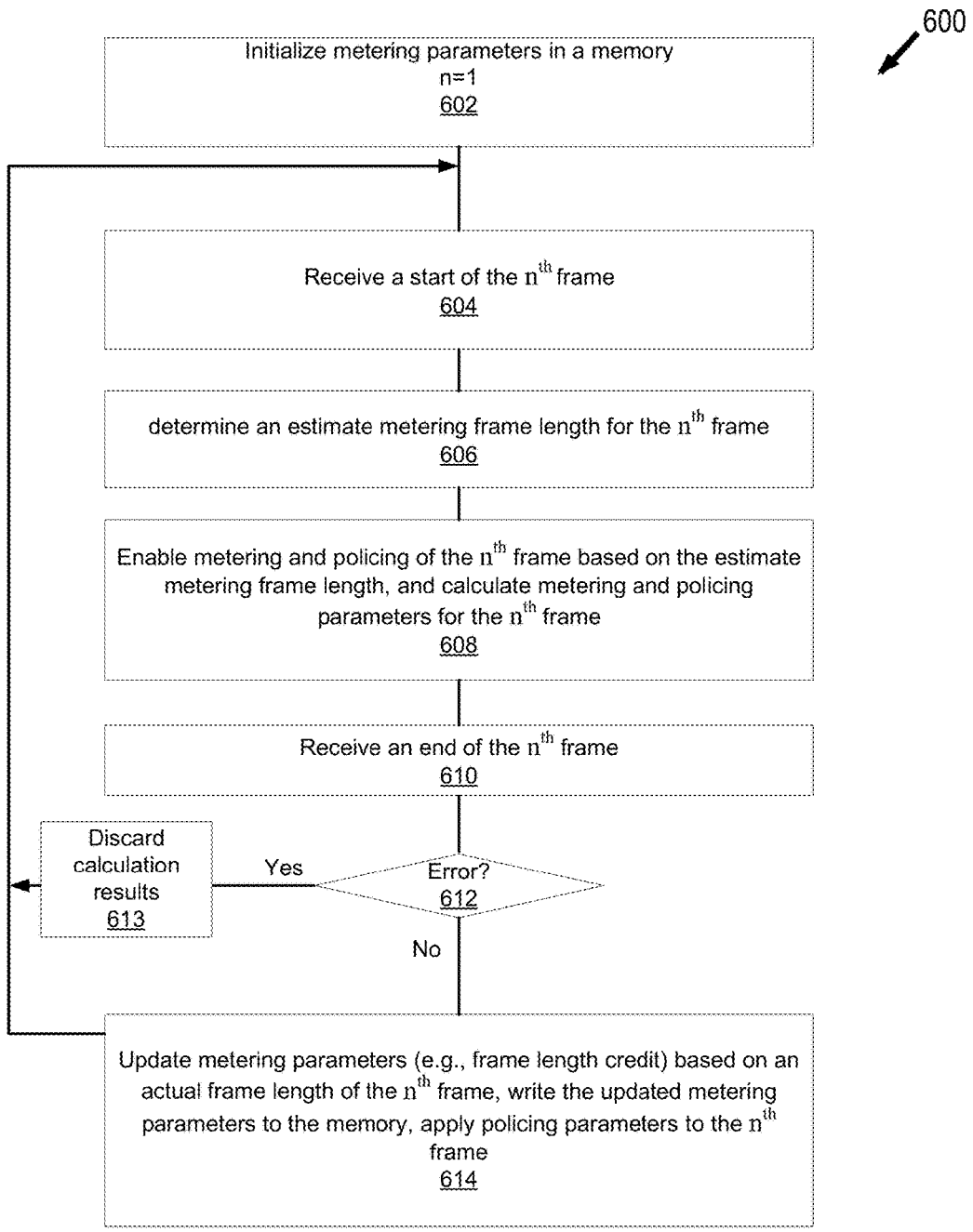
FIG. 6 is a flow diagram illustrating a method for low-latency metering and policing according to some embodiments of the present disclosure.

Referring to FIG. 8, illustrated therein is a table 800 including values of various metering parameters for a sequence of frames at various blocks of the method 600 of FIG. 6. In the example of FIG. 8, at block 602, in the metering memory 518, the frame credit has an initial value of 2000 bytes, which is a maximum frame length of the stream. The credit state has an initial value of "00."

As shown in row 802, the traffic policer 218 receives a start of the first frame. At block 606, the estimate metering frame length is set to be 2000 bytes, which is determined based on the frame credit and the credit state. That estimate metering frame length of 2000 bytes may be used to meter the first frame at block 608. At block 614, the actual frame length of the first frame is determined to be 64 bytes. The frame credit has a value of 1936 bytes, which is computed by deducting the actual frame length from the frame credit. The credit state is updated to be "01." At block 614, the updated frame credit and credit state may be written to the metering memory 518.

As shown in row 804, the traffic policer 218 receives a start of the second frame. At block 606, the estimate metering frame length for the second frame is computed to have a value of zero. That estimate metering frame length of zero may be used to meter the second frame at block 608. At block 614, the actual frame length is determined to be 1200 bytes. Accordingly, the updated frame credit is 736 bytes, and the credit state is "01."

As shown in row 806, the traffic policer 218 receives a start of the third frame. At block 606, the estimate metering frame length for the third frame is computed to have a value of zero. That estimate metering frame length of zero may be used to meter the third frame at block 608. At block 612, it is determined that the third frame is an error frame. As such, the frame credit and credit state remain unchanged.

As shown in row 808, the traffic policer 218 receives a start of the fourth frame. At block 606, the estimate metering frame length for the fourth frame is computed to have a value of zero. That estimate metering frame length of zero may be used to meter the fourth frame at block 608. At block 614, the actual frame length of the fourth frame is determined to be 900 bytes. According to lines 9 through 11 of FIG. 7, the updated frame credit is 164 bytes, and the credit state is "10."

As shown in row 810, the traffic policer 218 receives a start of the fifth frame. At block 606, the estimate metering frame length for the fifth frame is computed to have a value of 164 bytes. That estimate metering frame length of 164 bytes may be used to meter the fifth frame at block 608. At block 614, the actual frame length of the fifth frame is determined to be 600 bytes. According to lines 9 through 11 of FIG. 7, the frame credit is updated to have a value of 600 bytes, the credit state is "10."

As shown in row 812, the traffic policer 218 receives a start of the sixth frame. At block 606, the estimate metering frame length for the sixth frame is computed to have a value of 600 bytes. That estimate metering frame length of 600 bytes may be used to meter the sixth frame at block 608. At block 612, the sixth frame is determined to be an error frame. As such, the frame credit and the credit state remain the same.

As shown in row 814, the traffic policer 218 receives a start of the seventh frame. At block 606, the estimate metering frame length for the seventh frame is computed to have a value of 600 bytes. That estimate metering frame length of 600 bytes may be used to meter the seventh frame at block 608. At block 614, the actual frame length of the seven frame is determined to be 1536 bytes. According to lines 9 through 11 of FIG. 7, the frame credit is updated to have a value of 1536 bytes, and the credit state is "10."

As shown in row 814, the traffic policer 218 receives a start of the eighth frame. At block 606, the estimate metering frame length for the eighth frame is computed to have a value of 1536 bytes. That estimate metering frame length of 1536 bytes may be used to meter the eighth frame at block

608. At block 614, the actual frame length of the eighth frame is determined to be 800 bytes. According to lines 9 through 11 of FIG. 7, the frame credit is updated to have a value of 800 bytes, and the credit state is "10."

Figure 9:
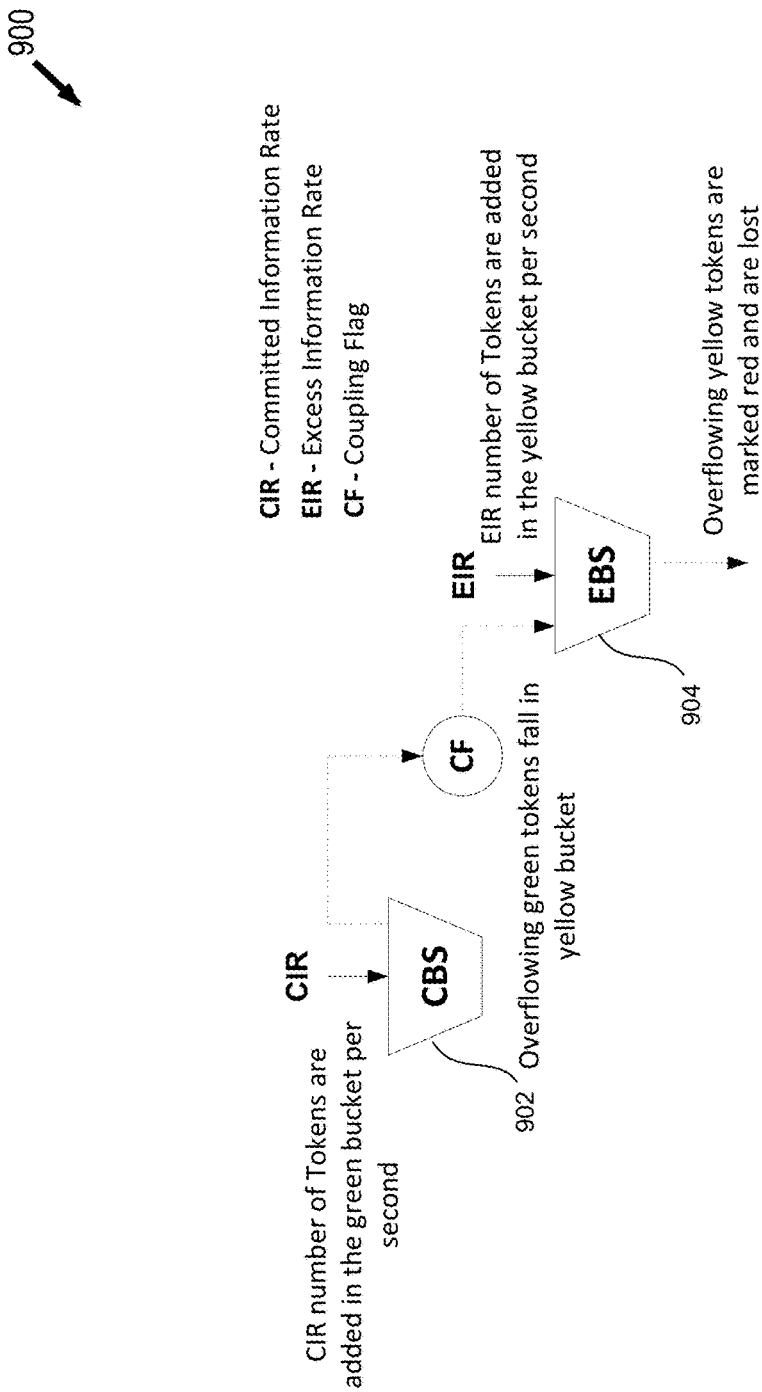
FIG. 9 illustrates an exemplary two-rate three-color metering algorithm according to some embodiments of the present disclosure.

Referring to FIG. 9, illustrated is an example of a two-rate three-color metering algorithm 900 that may be used at block 608 of the method 600. As illustrated in FIG. 9, the two-rate three-color metering algorithm 900 using a committed bucket (CB) 902 and an excess bucket (EB) 904. CIR is an amount of tokens per unit time that are replenished to the CB 902 and represents the minimum guaranteed bandwidth in traffic. EIR is an amount of tokens per unit time that are replenished to the EB 904. Committed burst size (CBS) is the maximum amount of tokens that may be stored in the CB 902. Committed bucket level at a given time t (CBL(t)) is an amount of tokens at time (t) in the CB 902 when a meter operation is performed. Excess burst size (EBS) is the maximum amount of tokens that may be stored in the EB 904. Excess bucket level at a given time t (EBL(t)) is an amount of tokens at the given time t in the EB 904 when a meter operation is performed. The tokens in the buckets CB 902 and EB 904 are drained when a frame is received, and the tokens are added at a predetermined rate. Based on token availability, a frame may be marked as green (CIR compliant), yellow (EIR compliant), and red. A frame marked green may not be dropped. A frame marked yellow may be dropped under congestion. A frame marked red may be dropped.

Figure 10:
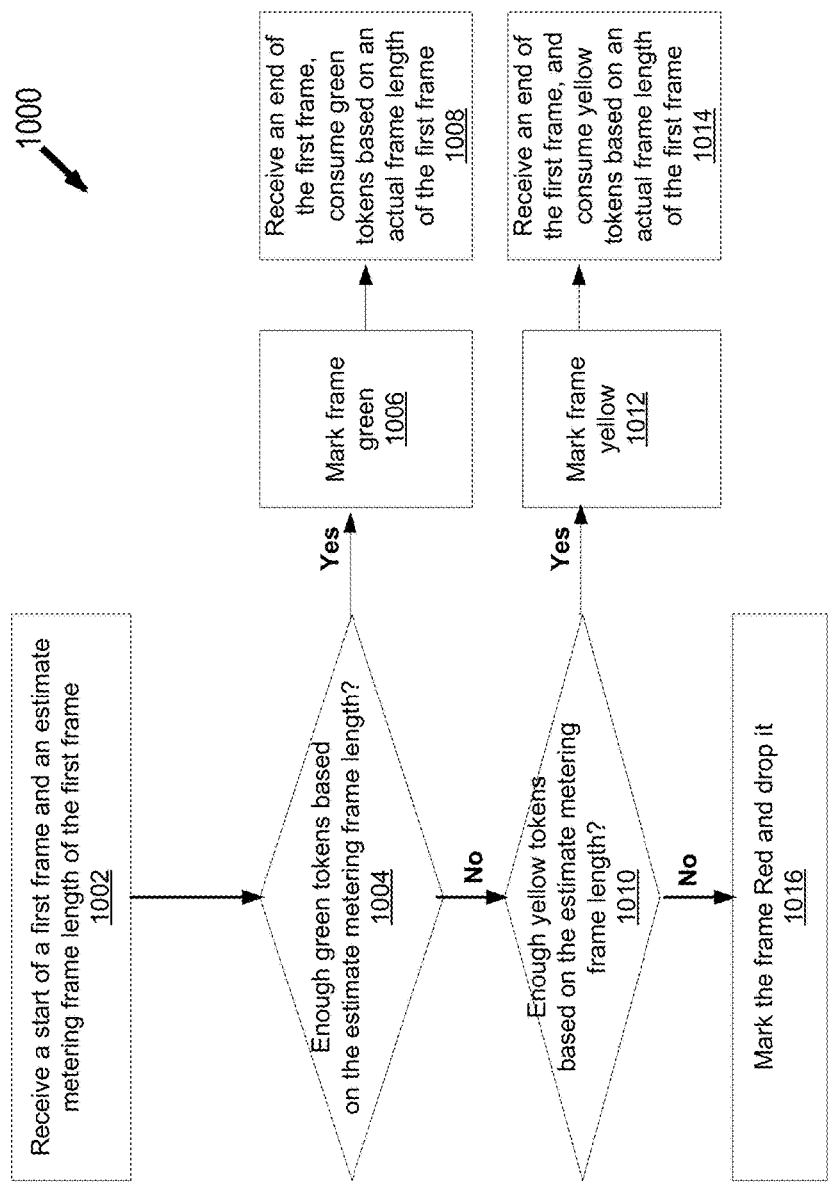
FIG. 10 illustrates a method for low-latency metering and policing using a two-rate three-color metering algorithm according to some embodiments of the present disclosure.

Referring to FIG. 10, illustrated therein is a flow chart of an example method 1000 for low latency metering and policing using the two-rate three-color metering algorithm 900 of FIG. 9. The method begins at block 1002, where a traffic policer receives a start of a first frame and an estimate metering frame length of the first frame. The method 1000 proceeds to block 1004 to determine whether there are enough green tokens based on the estimate metering frame length. In an example where it is determined that there are enough green tokens, the method 1000 proceeds to block 1006, where the first frame is marked as green. The method 1000 may then proceed to block 1008, where the traffic policer 218 receives an end of the first frame, and consume the green tokens based on an actual frame length of the first frame.

In some embodiments, at block 1004, it is determined that there are not enough green tokens, the method 1000 proceeds to block 1010 to determine whether there are enough yellow tokens based on the estimate metering frame length. In an example where it is determined that there are enough yellow tokens, the method 1000 proceeds to block 1012, where the first frame is marked as yellow. The method 1000 may then proceed to block 1014, where the traffic policer 218 receives an end of the first frame, and consume the yellow tokens based on an actual frame length of the first frame.

In some embodiments, at block 1010, it is determined that there are not enough yellow tokens. The method 1000 may then proceed to block 1016 to make the first frame red. The first frame with the red marking will be dropped.

In various embodiments, the switch 202 may use a shared memory architecture to support bandwidth metering on hundreds and thousands of streams. Because multiple incoming ports may be active simultaneously, a plurality of traffic policers 218 may be provided to a plurality of ingress ports of the switch 202 respectively. For a particular ingress port, a traffic policer 218 may be configured to handle filtering, metering, and policing for all the steams from that particular ingress port. As such, those streams may share the same memory containing various metering parameters, including metering constants (e.g., CIR, EIR, CBS, EBS, CF), time dependent variables (e.g., CBL(t) and EBL(t)), and timestamps. For each stream, after receiving a start of a frame, the traffic policer 218 may read from the memory to retrieve last stored metering parameters having a first timestamp. The traffic policer 218 may then calculate the time difference between that first timestamp, and calculate a token gain during that time difference. The metering unit 224 may determine frame color (e.g., green, yellow, red) of that frame (e.g., based on CBL(t) and EBL(t)). Based on the frame color, tokens are removed from the respective bucket, and CBL(t) and/or EBL(t) may be decremented by the frame length. For valid frames (e.g., frames having no error and having a color green or yellow), the memory is updated with the updated CBL(t), EBL(t) and the corresponding new timestamp. For invalid frames (e.g., frames having an error or having a color red), the memory may not be updated, thereby maintaining the last valid metering parameters and timestamp.

In some embodiments, a Precision Time Protocol (PTP) is used to synchronize clocks throughout a network. In an example, in the switch 202, instead of using the 80-bit PTP synchronized time, the lower 32-bit PTP synchronized time may be used to save implementation resources of the switch 202. However, because 32-bit time rolls over in a few seconds, it adds challenge when streams are in-active for several seconds/minutes. To address this challenge, the switch 202 implements an auto-update hardware function, which automatically (e.g., for each predefined period) scan the entire shared memory to update the metering parameters and corresponding timestamps. In an example, a metering function uses a shared memory for scalability uses about 24 clock cycles to perform the metering computations. This results in about 200 ns of additional switching latency where the network is 1 Gb/s and the time period is 8 ns. For TSN applications requiring less than 1 µs of the node to node latency, saving about 200 ns of latency becomes a critical differential factor. In an example, a minimum frame size for Ethernet for policing is 64-bytes (e.g., 64 clock cycles). As such, by initiating the metering and policing function with a start of the frame provides enough margins to perform the metering operation (e.g., at block 608 of FIG. 6 using about 24 clock cycles) within the frame duration (e.g., 60 clock cycles from block 604 to block 610 of FIG. 6). By initiating metering functions with the start of a frame and by providing complete compliance to IEEE 802.1QCi specification and TSN standards, a very low node to node latency may be maintained.

It is noted that various configurations (e.g., the metering algorithm, the maximum frame length, the number of ports of the switch 202) illustrated in FIGS. 2 through 10 are exemplary only and not intended to be limiting beyond what is specifically recited in the claims that follow. It will be understood by those skilled in that art in possession of this disclosure that other configurations may be used.

One or more elements in embodiments of the invention may be may be implemented by software, hardware (e.g., an application specific integrated circuit (ASIC), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device. The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A network device, comprising:
   a first port;
   a second port; and
   a traffic policer circuit configured to:
      provide a frame credit and a credit state associated with the frame credit;
      receive a start of a first frame of a first stream from the first port;
      after receiving the start of the first frame and prior to receiving an end of the first frame, determine an estimate frame length of the first frame based on the frame credit and the credit state;
      after generating the estimate frame length and prior to receiving the end of the first frame, meter the first frame based on the estimate frame length to mark the first frame with a first marking;
      in response to a determination of receiving the end of the first frame, determine an actual frame length of the first frame;
      update the frame credit and the credit state based on the actual frame length of the first frame; and
      forward the first frame to the second port by policing the first frame based on the first marking.

2. The network device of claim 1, wherein the traffic policer circuit is further configured to:
   prior to receiving the first stream, initialize the frame credit based on a maximum frame length of the first stream.

3. The network device of claim 2, wherein the credit state is selected from a group of states comprising an initial credit state indicating that the frame credit has an initial value, a positive credit state indicating that the frame credit has a positive value, and non-positive credit state indicating that the frame credit has a non-positive value.

4. The network device of claim 3, wherein to determine the estimate frame length, the traffic policer circuit is further configured to:
   in response to a determination that the credit state is the initial credit state, set the estimate frame length to a value of the frame credit.

5. The network device of claim 3, wherein to determine the estimate frame length, the traffic policer circuit is further configured to:
   in response to a determination that the credit state is the positive credit state, set the estimate frame length to a value of zero.

6. The network device of claim 3, wherein to determine the estimate frame length, the traffic policer circuit is further configured to:
   in response to a determination that the credit state is the non-positive credit state, set the estimate frame length to an absolute value of the frame credit.

7. The network device of claim 1, wherein to update the frame credit and the credit state, the traffic policer circuit is further configured to:
   update the frame credit by deducting the actual frame length from the frame credit; and
   write, to a storage element of the network device, the updated frame credit.

8. The network device of claim 1, wherein the traffic policer circuit is further configured to:
   in response to determining that the first frame is an error frame, skip updating the frame credit and the credit state.

9. The network device of claim 1, wherein the traffic policer circuit is further configured to:
   after receiving the start of the first frame, perform a first read to retrieve, from the storage element, one or more metering parameters;
   meter the first frame based on the estimate frame length and the one or more metering parameters.

10. The network device of claim 9, wherein the traffic policer circuit is configured to:
    after receiving a start of a second frame of a second stream from the first port of the network device, perform a second read to retrieve, from the storage element, the one or more metering parameters; and
    after performing the second read, meter the second frame of the second stream using the one or more metering parameters.

11. The network device of claim 1, wherein the traffic policer circuit is configured to:
    meter the first stream using a two-rate three-color metering algorithm.

12. The network device of claim 1, wherein the first marking is selected from a group of color markings consisting of a green marking, a yellow marking, and a red marking,
    wherein the green marking is associated with a committed frame for timely delivery,
    wherein the yellow marking is associated with an excess frame to be delivered on a best effort, and
    wherein the red marking is associated with a non-conformant frame that is to be discarded.

13. A method, comprising:
    providing, by a network device, a frame credit and a credit state associated with the frame credit;
    receiving, from a first port of the network device, a start of a first frame of a first stream;
    after receiving the start of the first frame and prior to receiving an end of the first frame, determining an estimate frame length of the first frame based on the frame credit and the credit state;
    after generating the estimate frame length and prior to receiving the end of the first frame, metering the first frame based on the estimate frame length to mark the first frame with a first marking;

in response to a determination of receiving the end of the first frame, determine an actual frame length of the first frame;

updating the frame credit and the credit state based on the actual frame length of the first frame; and forwarding, to a second port of the network device, the first frame by policing the first frame using the first marking.

14. The method of claim 13, further comprising:

prior to receiving the first stream, initializing the frame credit based on a maximum frame length of the first stream.

15. The method of claim 13, wherein the credit state is selected from a group of states comprising an initial credit state indicating that the frame credit has an initial value, a positive credit state indicating that the frame credit has a positive value, and non-positive credit state indicating that the frame credit has a non-positive value.

16. The method of claim 15, wherein the determining the estimate frame length includes:

in response to a determination that the credit state is the initial credit state, setting the estimate frame length to a value of the frame credit.

17. The method of claim 15, wherein the determining the estimate frame length includes:

in response to a determination that the credit state is the positive credit state, setting the estimate frame length to a value of zero.

18. The method of claim 15, wherein the determining the estimate frame length includes:

in response to a determination that the credit state is the non-positive credit state, setting the estimate frame length to an absolute value of the frame credit.

19. The method of claim 13, wherein the updating the frame credit and the credit state includes:

updating the frame credit by deducting the first actual frame length from the frame credit; and writing, to a storage element, the updated frame credit.

20. The method of claim 13, further comprising:

after receiving the start of the first frame, performing a first read to retrieve, from a storage element of the network device, one or more metering parameters;

after performing the first read, metering the first frame based on the estimate frame length and the one or more metering parameters;

after receiving a start of a second frame of a second stream from the first port of the network device, performing a second read to retrieve, from the storage element, the one or more metering parameters; and after performing the second read, metering the second frame of the second stream using the one or more metering parameters.

* * * * *